United States Patent [19]

Kühne

[11] Patent Number: 4,690,550
[45] Date of Patent: Sep. 1, 1987

[54] LASER RANGE FINDER

[75] Inventor: Christoph Kühne, Giengen/Brenz, Fed. Rep. of Germany

[73] Assignee: Carl-Zeiss-Stiftung, Heidenheim, Fed. Rep. of Germany

[21] Appl. No.: 764,852

[22] Filed: Aug. 12, 1985

[30] Foreign Application Priority Data

Jun. 27, 1985 [DE] Fed. Rep. of Germany ....... 8518594

[51] Int. Cl.$^4$ .............................................. G01C 3/08
[52] U.S. Cl. ......................................... 356/5; 350/6.6
[58] Field of Search .............................. 356/3, 4, 5, 7; 350/6.1, 6.5, 6.6

[56] References Cited

U.S. PATENT DOCUMENTS

| 4,290,670 | 9/1981 | Gerber ................................. 356/5 |
| 4,393,517 | 7/1983 | Buser et al. ........................ 356/5 |
| 4,559,445 | 12/1985 | Hedin et al. ...................... 356/5 |

Primary Examiner—L. T. Hix
Assistant Examiner—David M. Gray
Attorney, Agent, or Firm—Walter Ottesen

[57] ABSTRACT

A laser range finder is disclosed with a telescope common for transmitting and receiving. The laser range finder includes a wobble separator and a Keplerian telescope which are mounted between a laser light source and the common telescope. Energy losses in the emitted and reflected laser beam are prevented and a separation of the beam with a minimal tilting angle of the wobble mirror is made possible.

5 Claims, 1 Drawing Figure

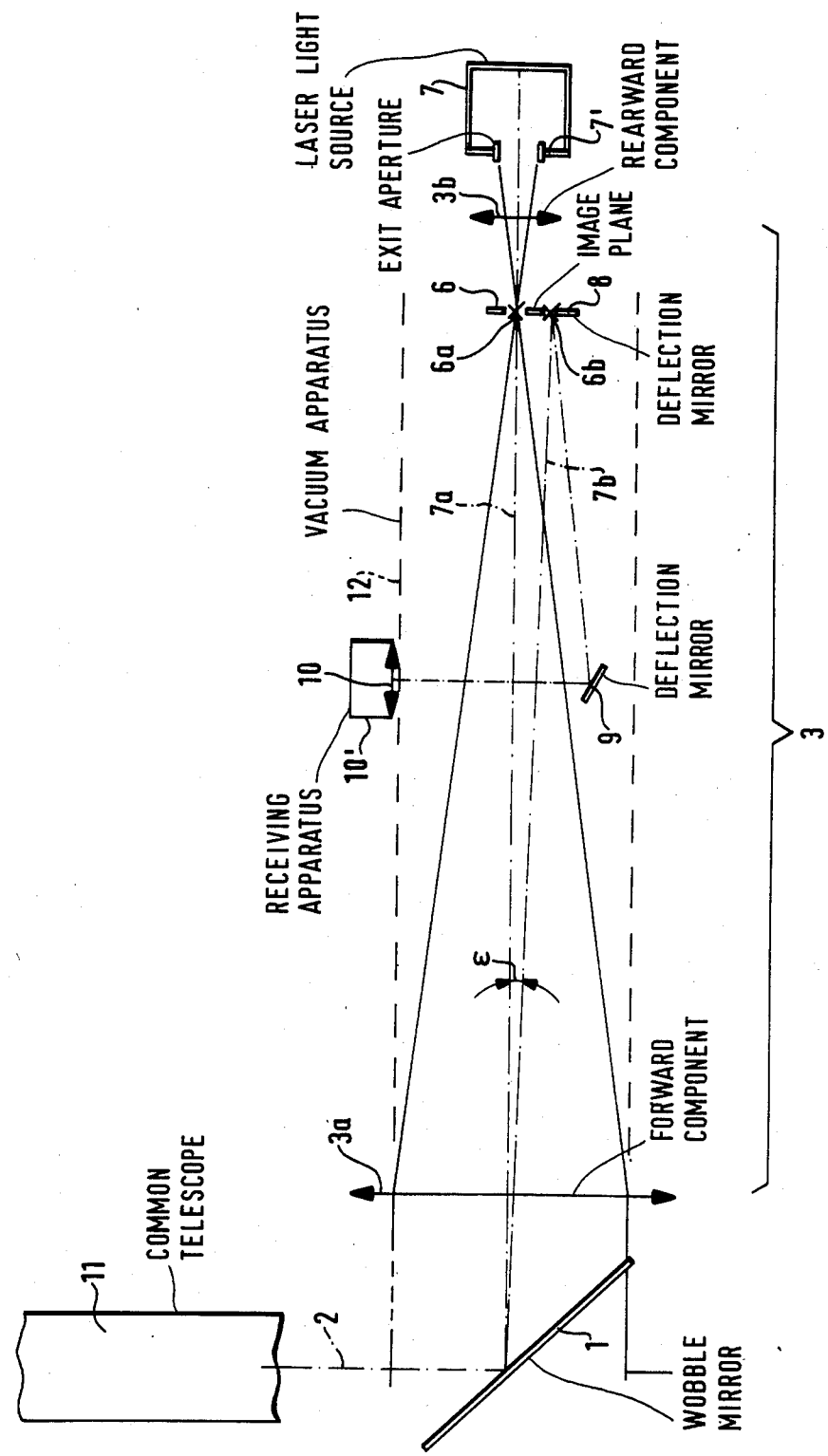

1

LASER RANGE FINDER

FIELD OF THE INVENTION

The invention relates to a laser range finder having a telescope which is common for the transmitter beam emanating from a light source and the receiving beam reflected from a target.

BACKGROUND OF THE INVENTION

With laser range finders, the distance between a measuring position and a target position is determined by measuring the time which the light of a laser pulse of a known rate of propagation requires in order to cover the distance between these two positions. A condition precedent is that the target is equipped with a retroreflector which reflects back the light of the laser pulse in the direction of incidence and that the measuring position is configured so that the emitted light bundle can be separated optically from the received bundle.

For this purpose, it is known to use two separate transmitting and receiving telescopes or beam splitters. With large target distances such as when making distance measurements to satellites, it is a disadvantage that the large target distance imposes high requirements on the directional precision of the measuring position and the use of separate transmitting and receiving telescopes causes difficulty because of variations of their optical axes. Furthermore, the high energy losses associated with large target distances make it practically impossible to utilize conventional methods of physical beam splitting (partially transmitting mirrors) for separating transmitting and receiving beams.

Accordingly, in the measurement of large target distances, a state of the art has developed wherein a single, usually large telescope for transmitting and receiving and a geometrical separation method for the two bundles are utilized. The separation method provides that a rotating mirror having one aperture or a plurality of apertures is positioned along a diagonal in the beam path of the laser and that its rotational movement is so controlled that a laser shot of the laser beam just passes one of the apertures and the returning receiving beam impinges upon the reflecting surface of the rotating mirror. From there, the beam is guided in the direction of the receiver.

A disadvantage of this method is that the rotational speed of the rotating mirror must be very precisely synchronized with the laser frequency because the mirror will be destroyed if the laser beam itself with its high energy density impinges on the mirror. An expansion of the laser beam to reduce the energy density cannot help to reduce this disadvantage because the diameter of the aperture must then be correspondingly increased. This in turn requires an increase of the linear velocity because a full mirror surface must be made available to the reflecting beam and this makes synchronization difficult. A further disadvantage of this method is that the even rotation of the mirror can be realized only with a great effort so that no vibrations are transmitted to the aperture.

SUMMARY OF THE INVENTION

It is an object of the invention to prevent the disadvantages of a rotating apertured disc in connection with a laser range finder and nonetheless exploit the advantages of a common telescope for transmitting and receiving.

The above object is realized by mounting a Keplerian telescope and a wobble mirror between the laser light source and the common telescope for splitting the above-mentioned beam and by providing a fixed reflecting mirror in the real image plane of the Keplerian telescope which is mounted so closely adjacent to the laser focus that it just does not shade the latter and which guides the receiving beam returning from the telescope to the receiving apparatus of the distance measuring device when the wobble mirror is in the displaced position.

In this context, the term "wobble" is the periodic displacement of the target axis of an optical system about a predetermined angle or about a linear amount in the focus of a telescope. This technology is known in the infrared spectrum region from astronomical observations.

Preferably, the two objectives of the Keplerian telescope are so dimensioned that the exit aperture of the laser is imaged on the pupil of the telescope in a geometrical-optical lossfree manner. In this way, geometrical-optical energy losses can be fully prevented by shading the light beams in the beam path of the telescope.

In an advantageous embodiment of the invention, the mirror in the image plane of the Keplerian telescope is provided with a sharp edge on the side thereof facing toward the laser focus. This knife edge permits an optical focussing of the telescope on the image plane in that the telescope is directed to a suitable star which can be observed at the laser end of the telescope through an appropriate ocular. This so-called Foucaultic cutting method is simple and highly sensitive for a precise determination of the focus and the focussing is, in turn, a precondition for the effectivity and the range of a laser range finder measuring station.

Since the danger of an air break-down exists with an ionic avalanche of air molecules occurring with the use of high energy lasers, it is suggested that the Keplerian telescope be configured as a recipient of a vacuum apparatus and that the optical components be placed vacuum-tight on the tube of the Keplerian telescope.

The advantages achieved with the invention are especially that energy losses are prevented since neither the emitted nor the reflected beam suffers an energy loss by means of optical elements (reflection, absorption, scattered light) which do not result perforce from the transmission of the laser pulse from the laser to the telescope or from the telescope to the receiving apparatus. A further advantage is the precise imaging of the entry pupil of the telescope on the emission aperture of the laser which is not possible with a Huygenic telescope utilized pursuant to the state of the art.

The introduction of the real focus in the Keplerian telescope permits a separation of transmitted and receiving beams with respect to the smallest displacement. This means a minimal tilt angle $\epsilon/2$ of the wobble mirror and therefore the smallest possible switching time between the positions of "transmit" and "receive". This, in turn, makes possible the measurement of satellites in the region of only several hundred kilometers flight elevation.

A further advantage is that the synchronization with the shot sequence of the laser is possible without problems since the tilt of the wobble mirror from one angular position to another angular position directly after the emitted or received laser pulse occurs without consideration as to how much time has elapsed therebetween. There is an upper boundary for the maximum permissible tilt time from position "send" to "receive" which is dependent upon the distance of the target position. For satellites, this time is several milliseconds which is achieved with wobble mirrors.

BRIEF DESCRIPTION OF THE DRAWING

The drawing shows a schematic representation of the laser range finder according to the invention.

DESCRIPTION OF THE PREFERRED EMBODIMENTS OF THE INVENTION

Reference numeral 1 identifies a deflection mirror which can be wobbled and is mounted in the beam path between the laser light source 7 and the common telescope 11. The mirror 1 is tiltable about a selectable small angle such that the main beam 2 of the target axis of the common telescope 11 is tilted after leaving the mirror 1 by an angle difference ε. Reference numeral 3 indicates a Keplerian telescope which has a real image plane 6 between its components 3a and 3b. The telescope 3 is configured to be afocal, that is, the image plane 6 lies in the focal points of the forward component 3a and of the rearward component 3b, respectively, of the telescope. Reference numeral 7' identifies the exit aperture of the laser utilized.

The emitted laser light beam enters the telescope 3 at component 3b, passes image plane 6 as a collimated image point 6a and leaves the telescope 3 at 3a as a parallel beam. With proper adjustment, the beam is deflected by means of the wobble mirror 1 into the target axis of the telescope 11 when this mirror 1 takes on the wobble position of "transmit". Reference numeral 8 identifies a deflection mirror which is disposed in the image plane 6 so as to be slightly inclined; however, it is laterally so displaced that the laser focus 6a is not shaded. The displacement is however small enough that the target axis 2 meets the mirror 8 in the focus 6b when the wobble mirror 1 takes on the position of "receive".

A further deflecting mirror is indicated by reference numeral 9. The mirror 9 is introduced because of practical reasons in order to direct the light coming from deflecting mirror 8 onto the entrance lens 10 of a receiving apparatus 10'. The deflecting mirror 9 is also mounted so that it does not shade the laser beam.

The position "transmit" of the wobble mirror 1 is its rest position. When a laser shot is released, then the laser beam 7a strikes the wobble mirror 1 via the rearward component 3b of the telescope 3, the collimated image point 6a and the forward component 3a of the telescope 3 and leaves the mirror 1 in the direction of the target axis 2.

The laser shot has a duration which is typically 1 ns to 100 ns depending upon the type and mode of emission. Directly after the laser shot, the wobble mirror 1 is tilted into the position "receive" with a typical tilting time of 1 to 5 ms. The laser beam reflected from the target reaches the inlet lens 10 of the receiving apparatus 10' via a path over the wobble mirror 1, the forward telescope component 3a, the laser focus 6b and the deflecting mirrors 8 and 9. The incoming beam is registered in the receiving apparatus 10' and the running time is measured. If the reflected pulse is registered, then the wobble mirror 1 is tilted back into the position "transmit" and stays in this position until a new laser pulse is transmitted.

The Keplerian telescope 3 is configured as a recipient of a vacuum apparatus 12 and the optical components (3a, 3b) are placed vacuum-tight on the tube of the Keplerian telescope.

It is understood that the foregoing description is that of the preferred embodiments of the invention and that various changes and modifications may be made thereto without departing from the spirit and scope of the invention as defined in the appended claims.

What is claimed is:

1. A laser range finder for use with a common telescope and comprising:
    a laser light source for generating and transmitting a transmitted light beam through said common telescope to a target whereat said light beam is reflected into said common telescope in the form of a receiving light beam;
    a Keplerian telescope mounted between said common telescope and said laser light source;
    wobble mirror means for wobbling between a first position for deflecting said transmitted light beam and a second position for deflecting said receiving light beam, said wobble mirror means being mounted between said common telescope and said Keplerian telescope for coacting with said Keplerian telescope to separate said transmitted light beam from said receiving light beam;
    said Keplerian telescope defining a real image plane and a laser focus whereat said transmitted light beam is focussed;
    a receiving apparatus for receiving said receiving light beams;
    said Keplerian telescope including a fixed deflecting mirror for directing said receiving light beam to said receiving apparatus when said wobble mirror means is in said second position; and,
    said fixed deflecting mirror being disposed in said image plans at a location next to said laser focus so as to not shade the latter.

2. The laser range finder of claim 1, wherein the common telescope has a pupil, said laser light source having an exit aperture; and, said Keplerian telescope having a forward objective adjacent said wobble mirror means and a rearward objective adjacent said laser light source, said objectives being configured so as to cause said exit aperture to be imaged in a geometrical-optical lossfree manner onto the pupil of the common telescope.

3. The laser range finder of claim 1, said fixed deflecting mirror being configured as a cutter in the context of the Foucaultic cutting process.

4. The laser range finder of claim 1, further comprising a vacuum apparatus for developing a vacuum, said Keplerian telescope being configured to accommodate said vacuum apparatus, said Keplerian telescope having a forward optical component adjacent said wobble mirror means and a rearward optical component adjacent said laser light source, said optical components and said receiving apparatus being mounted on said Keplerian telescope in a vacuum-tight manner.

5. A laser range finder arrrangement comprising:
    a common telescope;
    a laser light source for generating an transmitting a transmitted light beam through said common telescope to a target whereat said light beam is reflected into said common telescope in the form of a receiving light beam;

a Keplerian telescope mounted between said common telescope and said laser light source;

wobble mirror means for wobbling between a first position for deflecting said transmitted light beam and a second position for deflecting said receiving light beam, said wobble mirror means being mounted between said common telescope and said Keplerian telescope for coacting with said Keplerian telescope to separate said transmitted light beam from said receiving light beam;

said Keplerian telescope defining a real image plane and a laser focus whereat said transmitted light beam is focussed;

a receiving apparatus for receiving said receiving light beam;

said Keplerian telescope including a fixed deflecting mirror for directing said receiving light beam to said receiving apparatus when said wobble mirror means is in said second position; and, said fixed deflecting mirror being disposed in said image plane at a location next to said laser focus so as to not shade the latter.

* * * * *

UNITED STATES PATENT AND TRADEMARK OFFICE
CERTIFICATE OF CORRECTION

PATENT NO. : 4,690,550
DATED : September 1, 1987
INVENTOR(S) : Christoph Kühne

It is certified that error appears in the above-identified patent and that said Letters Patent is hereby corrected as shown below:

In column 4, line 33: delete "beams;" and substitute -- beam; -- therefor.

In column 4, line 39: delete "plans" and substitute -- plane -- therefor.

In column 4, line 64: delete "an" and substitute -- and -- therefor.

Signed and Sealed this

Twelfth Day of January, 1988

Attest:

DONALD J. QUIGG

Attesting Officer

Commissioner of Patents and Trademarks